F. C. KINDER.
BEET HARVESTER.
APPLICATION FILED MAR. 26, 1912.

1,031,274.

Patented July 2, 1912.

2 SHEETS—SHEET 2.

Witnesses
C. H. Kruger
George H. Snyder

Inventor
Frank C. Kinder
By Howard S. Smith
His Attorney

UNITED STATES PATENT OFFICE.

FRANK C. KINDER, OF FRANKLIN, OHIO, ASSIGNOR OF ONE-HALF TO WALTER B. SMITH, OF MIDDLETOWN, OHIO.

BEET-HARVESTER.

1,031,274.  Specification of Letters Patent.  Patented July 2, 1912.

Application filed March 26, 1912. Serial No. 686,263.

*To all whom it may concern:*

Be it known that I, FRANK C. KINDER, a citizen of the United States, residing at Franklin, in the county of Warren and State of Ohio, have invented certain new and useful Improvements in Beet-Harvesters, of which the following is a specification.

This invention relates to new and useful improvements in beet harvesters, and consists in the novel construction and arrangement of parts hereinafter set forth and described in the following specification and particularly pointed out in the subjoined claims.

The object of the invention is to provide a simple and efficient machine for digging, topping and depositing the beets in separate piles on the ground, without bruising them; and further, to provide in such a machine means whereby beets of varying sizes may be topped uniformly, with the result that the large percentage of sugar lost through improper topping is saved.

Figure 1:
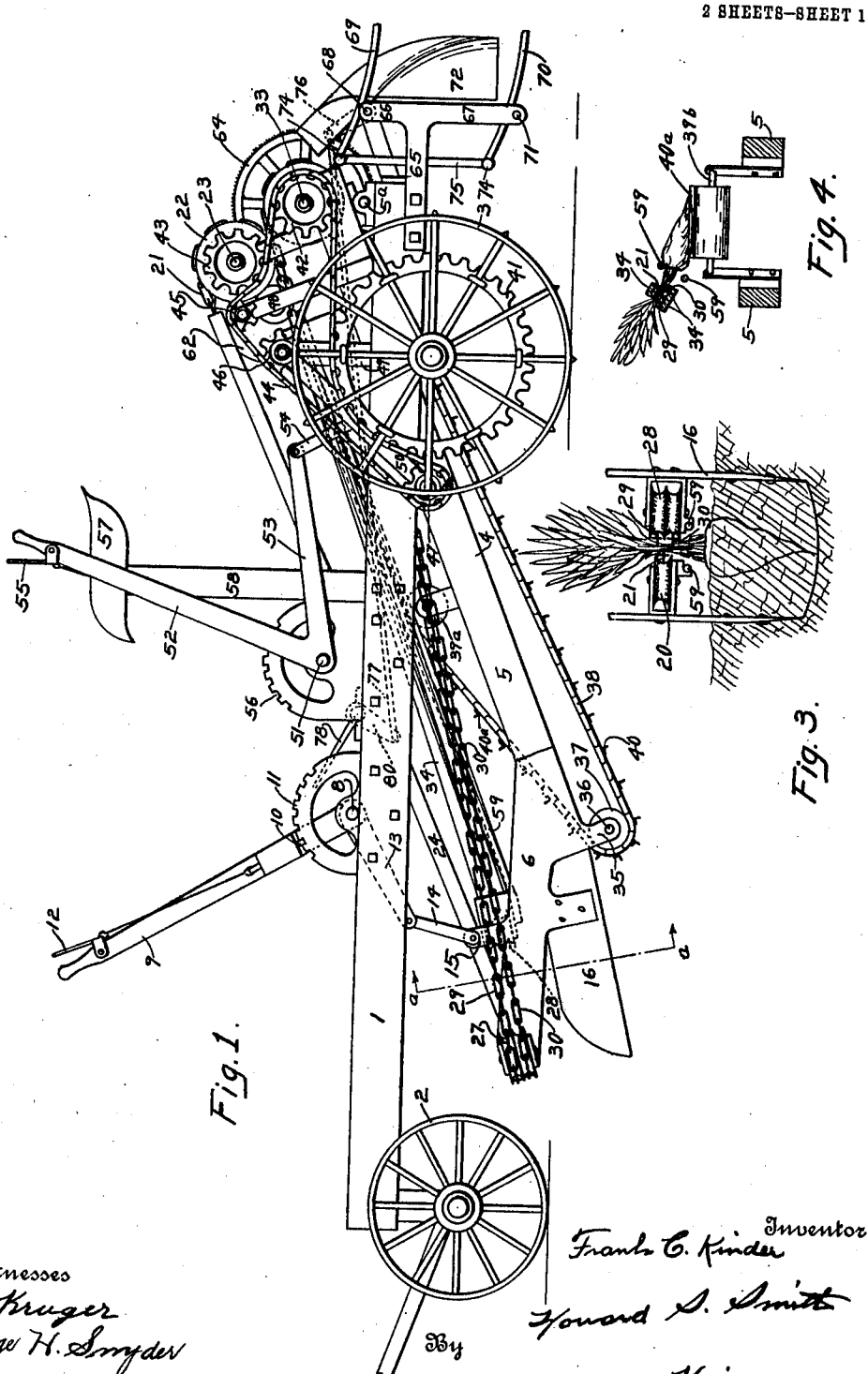
Figure 2:
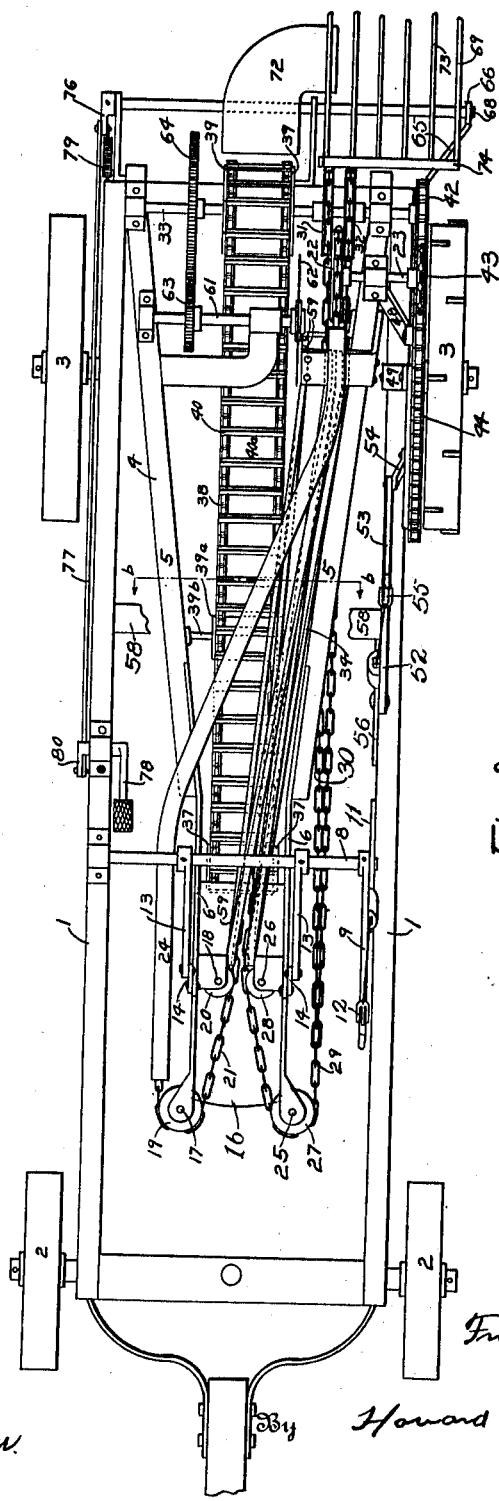

In the accompanying drawings, Figure 1 is a side view of my improved harvester; Fig. 2 is a top plan view of the same; Fig. 3 is a sectional view on the line $a$—$a$ of Fig. 1, showing the beet as its top is entering the grip of the endless chains; and Fig. 4 is a sectional view on the line $b$—$b$ of Fig. 2, showing the beet in the process of change from a vertical to a horizontal position.

Throughout the specification and drawings, similar reference characters denote corresponding parts.

In a detailed description of my invention, 1 designates the main frame of my harvester, which is mounted at its forward end upon supporting wheels 2 and at its rear end upon supporting wheels 3. Lying within the main frame 1, and mounted upon a shaft 5ª journaled in suitable bearings secured to the rear portion of said frame, is an auxiliary or carrier frame 4. The auxiliary frame 4 consists of two side members 5 to the forward ends of which are secured in any suitable manner, vertical plates 6 for supporting the forward mechanism of the harvester.

The front portion of the auxiliary frame 4 may be raised or lowered by the following mechanism. Journaled in suitable bearings secured to the main frame 1, is a rock shaft 8 to which is secured an operating lever 9 provided with a spring-actuated tooth 10 adapted to engage a toothed quadrant 11. The tooth 10 is controlled by a grip 12 pivoted on the lever 9. Fixed on the inner portion of said rock shaft 8 are two similar crank arms 13, and projecting from the plates 6, and integral therewith, are two similar upwardly extending arms 15. These arms 15 are connected to the crank arms 13 by links 14. When the lever 9 is moved rearwardly, the crank arms 13 will be raised, thereby elevating the forward portion of the frame 4 through the links 14 and arms 15, and by manipulating the grip 12 to bring the tooth 10 into engagement with the toothed quadrant 11, said frame 4 may be held in a raised position when rounding a curve or at the end of a row. Mounted between, and secured to the plates 6 in any suitable manner, is a downwardly projecting digging scoop 16, which engages the ground obliquely in order to dig the beets therefrom when the harvester is drawn over the field. Mounted on pivots 17 and 18 supported by the right-hand plate 6, are horizontally disposed pulleys 19 and 20 respectively, the pulley 19 being positioned to the right and in front of the pulley 20. Around the pulleys 19 and 20 passes an endless chain 21, preferably of the coil type, which also passes around a vertically disposed pulley 22, preferably of the pocket type, fast on a shaft 23 journaled in suitable bearings in the rear portion of the auxiliary frame 4. The upper run of the chain 21 passes through a tube 24 positioned longitudinally in the auxiliary frame, and suitably curved throughout its length to receive the said chain 21 as it leaves the pulley 22 and effectively guide it to the pulley 19. Secured to the left-hand plate 6, immediately opposite the pivots 18 and 19, are pivots 25 and 26 respectively, upon which are mounted horizontally disposed double-pulleys 27 and 28, the pulley 27 being positioned to the left and in front of the pulley 28. Around the pulleys 27 and 28 pass endless chains 29 and 30, preferably of the coil type, which also pass around vertically disposed pulleys 31 and 32, preferably of the pocket type, fast on a shaft 33 journaled in suitable bearings secured to the rear portion of the auxiliary frame 4. The pulleys 20 and 28 lie in approximately the same plane and in close proximity to each other, so that the chains passing around these pulleys may grip the beet as it is presented to them by the digging scoop 16, see Fig. 3. The chains 21, 29 and 30, as they pass to the rear of the harvester, are supported by channel irons 34 mounted longitudinally in the auxiliary frame 24, one for each chain, and which are twisted throughout their lengths to conform to the contour of the chains in their rearward movement.

Journaled for rotation in arms 35 extending downwardly from and formed integral with the plates 6, is a shaft 36 upon which are fixed two similar sprocket wheels 37. Around the latter pass endless sprocket chains 38, which also pass around sprocket wheels 39 fixed on the shaft 33, and over idler sprocket wheels 39$^a$ fast on a shaft 39$^b$ journaled in suitable bearings secured to the members 5 of the auxiliary frame 4, at a point approximately equidistant from the sprocket wheels 37 and 39. These sprocket chains 38 are connected at spaced intervals by transverse members 40 to form an endless carrier 40$^a$. The sprocket wheels 37 lie well below the pulleys 20 and 28 in the forward end of the auxiliary frame 4, so that while the tops of the beets are gripped and held firmly between the chains 21, 29 and 30, the body portions of said beets may be received by the endless carrier 40$^a$, which, in conjunction with the gripping chains, conveys and properly presents the beet to a topping device to be hereinafter described.

In order that the endless carrier 40$^a$ and the gripping chains 21, 29 and 30 may be driven at a uniform rate of speed, the following mechanism is provided. The left-hand rear supporting wheel 3 has provided on its inner face a sprocket wheel 41, and fixed on the left-hand ends of the shafts 33 and 23 are sprocket wheels 42 and 43 respectively. A sprocket chain 44 passes over the sprocket wheel 41, around the sprocket wheel 42, and around a part of the lower periphery of the sprocket wheel 43, and thence over idlers 45, 46 and 47, the first two of which being supported by standards 48 and 49 respectively, secured to the auxiliary frame 4, and the latter by an arm 50 pivoted to the upper end of the standard 49. When the harvester is drawn over a row of beets, the wheel 3 will rotate the sprocket wheel 41, and motion will be transmitted therefrom to the sprocket wheels 42 and 43 through the sprocket chain 44. The sprocket wheels 42 and 43 will be rotated in opposite directions, for the reason that the chain 44 passes almost completely around the former and around only a part of the lower periphery of the latter. It will now be seen that the endless carrier chains 38, and the gripping chains 29 and 30 will be driven at a uniform speed, as the sprocket wheels 39 around which the sprocket chains 38 pass, and the pulleys 31 and 32 around which the gripping chains 29 and 30 pass, are fixed on the same shaft 33, which is rotated by sprocket and chain connection with the driving wheel 3, as described. And the gripping chain 21 will be driven in like direction and at the same speed, through the sprocket and chain connection of its shaft with the said driving wheel 3.

For the purpose of disconnecting the operating mechanism from the said driving wheel 3, thereby allowing the harvester to run idly, the following construction is provided. Secured to a rock shaft 51 supported by the main frame 1, is a bell-crank operating lever 52, whose rearwardly extending arm 53 is connected, by means of a link 54, to the arm 50 which supports the idler 47. The locking means for this lever are the same as those provided for the lever 9, consisting of a grip 55 for controlling a spring-actuated tooth (not shown) which engages a toothed quadrant 56. When the lever 52 is moved forwardly, the arm 53 thereof will be elevated, thereby raising the link 54, arm 50 and idler 47 to disengage the sprocket chain 44 from the sprocket wheel 41, and by locking the lever in its forward position by means of the locking construction referred to, said sprocket wheel and chain may be held from engagement for any length of time desired. In order that the driver may easily control both the levers 9 and 52, a seat 57 for the driver is secured to a standard 58 supported by the main frame 1 at a point immediately behind the operating lever 52.

In order to firmly hold the body portion of the beet on the endless carrier 40$^a$ against the pull exerted by the gripping chains 21, 29 and 30, longitudinal guide rods 59 are secured in the auxiliary frame 4, said rods being laterally adjustable at their rear ends. These rods 59 are spaced far enough apart to allow the tops of the beets to pass freely between them, at the same time holding the beet on the endless carrier against any pull exerted by the gripping chains. And since the beet is received by the said chains and carrier in a vertical position and gradually changed by them to a horizontal position, the rods 59 lie in a horizontal plane in the front end of the harvester and in a vertical plane in the rear end thereof in order that the top of the beet may at no time be pinched between them. (See Figs. 3 and 4.)

Journaled for rotation in suitable bearings secured to the rear portion of the auxiliary frame 4, is a horizontal shaft 61 carrying on its left-hand end a vertically disposed cutting disk 62. Also fixed on this shaft 61 near its other end is a gear 63 which meshes with a gear 64 fixed on the shaft 33. Therefore, when the shaft 33 is rotated through its sprocket and chain connection to the driving wheel 3, the shaft 61 carrying the cutting disk 62 will also be rotated through the medium of the gears 63 and 64. The beet is presented to the cutting disk 62 in a horizontal position by the endless carrier and the gripping chains, and is properly tensioned for cutting by the guide rods 59 which lie between said carrier and chains. The cutting disk, which is positioned between the guide rods and the endless carrier, enters the beet at a point immediately below its top and quickly and cleanly severs the same from the body portion. The body portion of the beet is at no time bruised or mutilated, for the reason that the top only is gripped by the gripping chains.

Suitably secured to each of the two rear side members of the main frame 1, is a horizontal support 65 carrying vertically disposed arms 66 and 67. Journaled in the arms 66 is a shaft 68 upon which is mounted a receptacle 69 for receiving the tops of the beets from the gripping chains. Located immediately below the receptacle 69 and mounted on a shaft 71 journaled in the arms 67, is a receptacle 70 to which the body portions of the beets are delivered by a spiral incline chute 72 secured to the rear portion of the frame 1 in a position to receive said body portions from the endless carrier 40ª. The receptacles 69 and 70 are similar in construction, each comprising a number of curved rods or staves 73 joined together at their front ends by a transverse member 74. The said receptacles 69 and 70 are connected by a rod 75, whereby both may be tilted by an arm 76 which is fast on the shaft 68 and connected by a rod 77 to an arm 80 of a foot lever 78. The foot lever 78 is located near the driver's seat, and when depressed, tilts the receptacles 69 and 70 at the same time, whereupon the body portions of the beets will be first deposited upon the ground to be covered and protected by the tops which fall upon them. When pressure on the foot lever is released, the said receptacles will be returned to their normal positions by a spring 79, one end of which is secured to the arm 76 and the other to the main frame 1.

In operation, as the harvester is drawn over a row of beets, the scoop 16 enters the ground, runs under the beets and forces them, with any accompanying dirt, onto the endless carrier 40ª. The tops of the beets, as they pass rearward, are gripped by the chains 21, 29 and 30, as is shown in Fig. 3. The beet is received by the said carrier 40ª in a vertical position and is gradually changed to a horizontal position in the following manner. The endless carrier at the point where it receives the beets, is in a plane below the gripping chains, and as said carrier passes to the rear of the harvester, it gradually approaches the horizontal plane of the gripping chains; therefore, the beet, whose top is in the grip of said chains, which move along with the endless carrier is slowly changed from a vertical to a horizontal position. These chains, as they pass rearwardly, gradually twist or overlap, due to the horizontal and vertical positions of their front and rear pulleys respectively, and aided by the twisted channel irons in which the chains rest. Therefore, as the body portions of the beets are changed from a vertical to a horizontal position, the twisting of the gripping chains, as they pass rearwardly, alters the positions of the tops of the beets to correspond with that of their body portions. The guide rods 59 also coöperate with the endless carrier and the gripping chains in effecting this change in the position of the beets, and perform the additional function of bringing beets of varying sizes into a position to be uniformly topped. These guide rods are in a horizontal plane at the point where the tops of the beets are first gripped by the endless chains, and gradually assume a vertical position. The tops of the beets may therefore pass between these rods at all times, said rods also holding the body portions of the beets securely on the carrier 40ª against any pull that may be exerted by the gripping chains, and when that pull is great, the tension of said chains is sufficiently lax to permit the tops of the beets to be gradually drawn from their grip until the point is reached where the pull of the body portion of the beet, due to contact with the guide rods, is balanced by the force exerted by the gripping chains. The beet is then presented to the cutting disk 62 in a horizontal position for topping. After it is topped, the body portion falls into the chute 72 by which it is conveyed to the receptacle 70, while the top falls directly into the receptacle 69. Both receptacles may be tilted at suitable intervals to deposit the beets and tops in the same pile, the latter forming a protective cover for the former.

I do not wish to be limited to the particular embodiments of the invention herein shown and described, and any changes or modifications may be made therein within the scope of the subjoined claims.

Having described my invention, I claim:

1. In a beet harvester, a beet digging device, means for gripping the tops of the beets as they are dug from the ground, an endless carrier comprising sprocket chains connected together at spaced intervals to receive the body portions of said beets from the digging device, guiding members intermediate the gripping means and the endless carrier, and a cutting disk between the guiding members and the endless carrier for topping the beets, said gripping means, guiding members and endless carrier coöperating to bring the beet into position to be topped by the cutting disk, substantially as shown and described.

2. In a beet harvester, a beet digging device, endless chains for gripping the tops of the beets as they are dug from the ground, an endless carrier comprising sprocket chains connected together at spaced intervals by transverse members, to receive the body portions of the beets from the digging device, guiding rods intermediate the gripping chains and the endless carrier for holding the beets in position on the carrier, and a vertically disposed cutting disk between the guiding rods and the endless carrier, for topping the beets, said endless chains, guiding rods and endless carrier coöperating to bring the beet into a horizontal position to be topped by the cutting disk, substantially as shown and described.

3. In a beet harvester, a vertically disposed cutting disk, an endless carrier on one side of the cutting disk for holding the body portion of the beet, and endless chains on the other side thereof for gripping the top of the beet, means for driving the endless carrier and the gripping chains at the same rate of speed to present the beet to the cutting disk for topping, and two parallel guide rods between the cutting disk and the gripping chains, said guide rods being spaced apart sufficiently to permit the top of the beet to pass freely between them and at the same time preventing the body portion of the beet being drawn from the carrier by the gripping chains, the tension of said chains being such as to permit the top of the beet to be drawn laterally when a pull is exerted thereon by the body portion of the beet contacting with the guide rods, whereby beets of varying sizes may be topped uniformly, substantially as shown and described.

4. A beet harvester comprising a main frame, supporting wheels on which said main frame is mounted, an auxiliary frame within said main frame and pivoted at the rear end thereof, means for raising and lowering the front end of the auxiliary frame, a digging scoop mounted in the forward end of said frame, pulleys provided in the forward and rear ends of said auxiliary frame, endless chains passing around said pulleys to grip the tops of the beets, as they are dug from the ground, sprocket wheels provided in the front and rear ends of the auxiliary frame, chains passing around said sprocket wheels and connected together at spaced intervals by transverse members to form an endless carrier to receive the body portions of the beets from the digging scoop, guide rods provided in said auxiliary frame between the gripping chains and the endless carrier to position the beets on the carrier irrespective of the size of the beet or the length of its top, connections between one of the rear supporting wheels and the carrier and gripping chains for driving said carrier and chains at a uniform speed, and a cutting disk provided in the rear end of the auxiliary frame between the guide rods and the endless carrier for topping the beets as they are presented to it by the gripping chains and the endless carrier, substantially as shown and described.

In testimony whereof I have hereunto set my hand this 23rd day of March, A. D. 1912.

FRANK C. KINDER.

Witnesses:
BYRON B. HARLAN,
HOWARD S. SMITH.

Copies of this patent may be obtained for five cents each, by addressing the "Commissioner of Patents, Washington, D. C."